United States Patent [19]
Chiba

[11] Patent Number: 5,661,712
[45] Date of Patent: Aug. 26, 1997

[54] LIGHT PHASE MODULATING DEVICE AND OPTICAL DATA RECORDING AND REPRODUCING APPARATUS

[75] Inventor: Toru Chiba, Tokyo, Japan

[73] Assignee: Asahi Kogaku Kogyo Kabushiki Kaisha, Tokyo, Japan

[21] Appl. No.: 606,414

[22] Filed: Feb. 23, 1996

[30] Foreign Application Priority Data

Feb. 24, 1995 [JP] Japan .................. 7-061748

[51] Int. Cl.$^6$ .................. G11B 7/00; G02B 26/00
[52] U.S. Cl. .................. 369/116; 359/290; 359/295; 349/143; 349/54; 349/151; 349/153
[58] Field of Search .................. 369/116; 359/290, 359/295; 349/42, 54, 143, 151, 152, 153

[56] References Cited

U.S. PATENT DOCUMENTS

| | | | |
|---|---|---|---|
| 5,078,479 | 1/1992 | Vuilleumier | 359/290 |
| 5,223,970 | 6/1993 | Oono et al. | 359/223 |
| 5,285,301 | 2/1994 | Shirahashi et al. | 349/143 |
| 5,302,987 | 4/1994 | Kanemori et al. | 349/143 |
| 5,317,144 | 5/1994 | Oono et al. | 250/201.5 |
| 5,331,447 | 7/1994 | Someya et al. | 349/54 |
| 5,515,191 | 5/1996 | Swirbel | 349/143 |
| 5,521,731 | 5/1996 | Fukuyama et al. | 349/143 |
| 5,535,030 | 7/1996 | Ogura et al. | 349/153 |
| 5,566,008 | 10/1996 | Yoshida et al. | 349/153 |

Primary Examiner—Loha Ben
Attorney, Agent, or Firm—Greenblum & Bernstein, P.L.C.

[57] ABSTRACT

A light phase modulating device that modulates a phase of light transmitted therethrough in a plane perpendicular to the optical axis. The light phase modulating device has a pair of transparent substrates that hold a liquid crystal therebetween and which are each provided with a plurality of pixel electrodes arranged in a dot matrix. Data lines are provided and each one is correspondingly connected to each of the electrodes. An insulation layer insulates corresponding data lines and electrodes from other corresponding data lines and electrodes. The surface of the insulation layer that is located closer to the liquid crystal than the data lines lies in a plane substantially perpendicular to the optical axis. The insulation layer, the pixel electrodes and the data lines all have substantially the same refractive index.

16 Claims, 7 Drawing Sheets

LIGHT PHASE MODULATING DEVICE AND OPTICAL DATA RECORDING AND REPRODUCING APPARATUS

BACKGROUND OF THE INVENTION

1. Field of the Invention

This application is related to the commonly assigned U.S. application Ser. No. 08/591,299, which was filed on Jan. 25, 1996, the disclosure of which is expressly incorporated by reference herein.

The present invention relates to a light phase modulating device used in an optical data recording and reproducing apparatus, such as a magneto-optic disc apparatus, and the optical data recording and reproducing apparatus.

2. Description of Related Art

In a magneto-optic disc apparatus, data magnetically recorded on a magneto-optic disc (recording medium) is reproduced by making linearly polarized light incident upon the recording medium and detecting a slight change in the state of the polarization of the signal light reflected by the recording medium. However, the phase of the reflected light is subject to a modulation due to either the phase of the incident laser beams being unstable, disturbance, temperature/humidity, or an irregular thickness of the recording disc, etc., and hence the S/N (signal-to-noise ratio) of the signal to be reproduced deteriorates.

To prevent deterioration of the S/N, in the prior art, the optical elements of the apparatus are produced and assembled as precisely as possible. However, due to this required strict precision, production, assembly and adjustment require a long time and are costly.

SUMMARY OF THE INVENTION

It is an object of the present invention to provide a light phase modulating device in which not only can the required strict precision in the manufacture and adjustment of the optical components of the device be eased, but also the S/N of the signals to be reproduced can be improved.

To achieve the object mentioned above, according to an aspect of the present invention, there is provided a light phase modulating device which modulates a phase of light transmitted therethrough in a plane perpendicular to the optical axis. The light phase modulating device comprises a pair of transparent substrates which hold therebetween a liquid crystal and which are each provided with a plurality of pixel electrodes. Each one of the pixel electrodes is connected to a corresponding data line. An insulation layer insulates the corresponding data lines and pixel electrodes from other corresponding data lines and pixel electrodes. That surface of the insulation layer located closer to the liquid crystal than the data lines, lies in a plane substantially perpendicular to the optical axis. The insulation layer, the pixel electrodes and the data lines have substantially the same refractive index.

According to another aspect of the present invention, there is provided a light phase modulating device which modulates a phase of light transmitted therethrough in a plane perpendicular to the optical axis. The light phase modulating device comprises a transparent first substrate and a second substrate which hold therebetween a liquid crystal. A plurality of data lines are provided on the substrates to which a plurality of pixel electrodes are correspondingly connected. An insulation layer insulates the corresponding data lines and pixel electrodes from other corresponding data lines and pixel electrodes. The insulation layer, the pixel electrodes and the data lines, provided on the first substrate, have substantially the same refractive index. The insulation layer has a surface provided on the first substrate which lies in a plane located closer to the liquid crystal than the data lines, and lies in a plane substantially perpendicular to the optical axis of the incident light. The second substrate is provided with a reflection layer which reflects the light incident thereupon from the first substrate.

The pixel electrodes are independently driven by the corresponding data lines.

According to a further aspect of the present invention, an optical data recording and reproducing apparatus is provided for correcting a wavefront aberration of light emitted from a light source and converged onto a data recording medium through an image forming optical system. This optical data recording and reproducing apparatus comprises a liquid crystal matrix (LC matrix) comprised of a number of liquid crystal elements (LC elements) in a two-dimensional matrix arrangement. The LC matrix is located in an optical path between the light source and the data recording medium. Each LC element of the LC matrix is capable of independently controlling a phase of light incident thereupon. A liquid crystal control means (LC control means) individually controls the LC elements to minimize the wavefront aberration of a beam spot converged onto the data recording medium.

The LC matrix comprises a pair of transparent substrates which holds a liquid crystal therebetween. A plurality of pixel electrodes are located inside the transparent substrates and are arranged in a dot matrix. A plurality of data lines are provided and each data line is connected to a corresponding pixel electrode. Insulation layers are located between the liquid crystal and the transparent substrates, and at least the data lines are embedded in these insulation layers, so that the pixel electrodes and the transparent substrates are kept parallel.

The present disclosure relates to subject matter contained in the Japanese Patent Application No. 7-61748 (filed on Feb. 24, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

The following discussion will be directed to an optical data recording and reproducing apparatus in which embodiments of a light phase modulating device of the present invention are incorporated therein. In the following embodiments, a magneto-optic disc apparatus is used as an optical data recording and reproducing apparatus.

Figure 1:
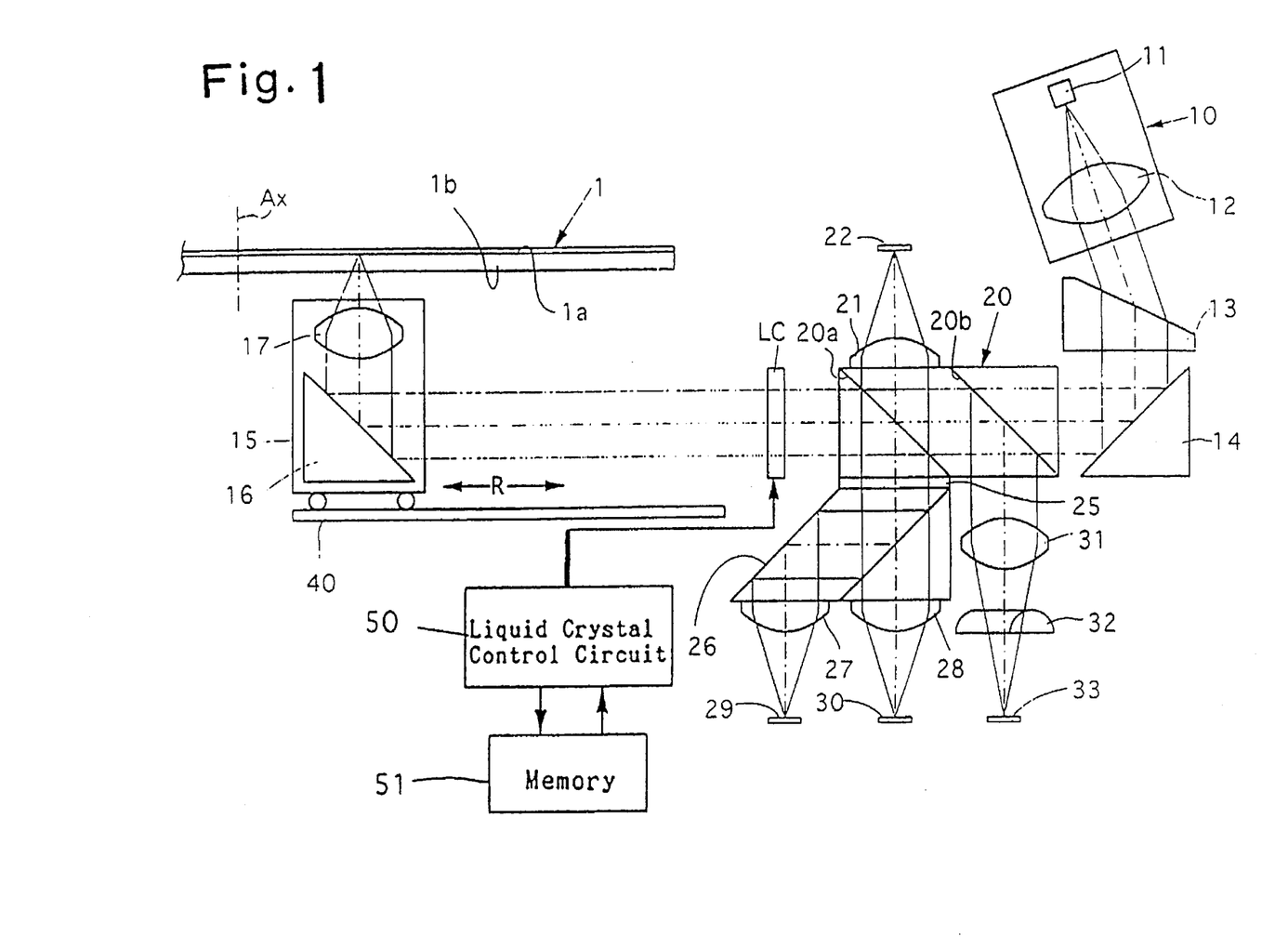
FIG. 1 is an explanatory view of an optical system of a magneto-optic disc apparatus having a light phase modulating device (LC matrix), according to a first embodiment of the present invention.

FIG. 1 shows a first embodiment of an optical system of a magneto-optic disc apparatus having a light phase modulating device.

A magneto-optic disc 1 is used as a recording medium and is comprised of a recording surface 1a on which magnetic data is recorded, and a transparent substrate 1b which covers and supports the recording surface 1a. The magneto-optic disc 1 is rotated about a rotation axis Ax by a spindle motor (not shown).

The optical system is provided with a light source portion 10 which is comprised of a semiconductor laser 11 and a collimating lens 12 which collimates divergent light emitted from the laser 11. The laser light emitted from the light source portion 10 has an elliptical cross sectional shape and is corrected to have a circular cross sectional shape by an anamorphic prism 13, and is then reflected by a reflecting mirror 14 toward a compound prism 20 having two half mirror surfaces, i.e., a first half mirror surface 20a and a second half mirror surface 20b. The light incident upon the compound prism 20 is partly reflected by the first half mirror surface 20a and, after passing through a condenser lens 21, is received by an APC (automatic phase control) sensor 22 which detects and controls the power of the semiconductor laser 11.

The light transmitted through the compound prism 20 is transmitted through an LC matrix (LC) and is made incident upon a movable portion 15. The LC matrix is comprised of a large number of LC elements (pixels, micro units) arranged in a dot matrix. Since the refractive index of a liquid crystal varies depending on the voltage applied thereto, the refractive index distribution in a section perpendicular to the direction of the travel of the light can be optionally selected by independently controlling the voltage to be applied to the LC elements of the LC matrix, to thereby control the phase of the light transmitted through the LC elements. In the illustrated embodiment, the matrix is a square matrix consisting of 32×32 LC elements per 4 mm×4 mm size (e.g. entire matrix of elements).

The LC matrix is controlled by an LC controller (control circuit) 50 in an fashion. The LC controller 50 independently controls a voltage to be applied to each pixel (image element) of the LC matrix in accordance with control data stored in a memory 51 to control the refractive index of the LC matrix for each pixel unit. The control data represents the voltage value to be applied to each pixel of the LC matrix and is set in advance, in accordance with a wavefront aberration measured by an external measuring apparatus.

The measurement of the wavefront aberration using an external measuring apparatus is, carried out for each product (magneto-optic disc apparatus), or a product or products sampled from each lot of products. The control data to correct the wavefront aberration is prestored in the memory 51.

The movable portion 15 is comprised of a reflecting mirror 16 which reflects the laser light, emitted parallel with the surface of the magneto-optic disc from the compound prism 20, into a direction perpendicular to the surface of the magneto-optic disc, and an objective lens 17 which converges the light reflected by the reflecting mirror 16 onto the recording surface 1a of the magneto-optic disc 1. The movable portion 15 is moved on and along a guide rail 40 in the radial direction R of the disc 1, to thus have access to an optional (adjacent) track of the magneto-optic disc 1.

The light reflected by the magneto-optic disc 1 is made incident upon the compound prism 20 through the objective lens 17, the reflecting mirror 16, and the LC matrix (LC). The light reflected by the first half mirror surface 20a is transmitted through a ½ wave plate 25 which rotates the direction of polarization by 45°. The light is then split by a polarization beam splitter 26 into a P-polarized light component and an S-polarized light component. The P-polarized light and the S-polarized light are received by first and second light receiving elements 29 and 30, through condenser lenses 27 and 28, respectively. The first and second light receiving elements 29 and 30 detect data signals.

The light transmitted through the first half mirror surface 20a and reflected by the second half mirror surface 20b is condensed by a condenser lens 31 and a cylindrical lens 32. That light which has an astigmatism is then converged onto and received by a third light receiving element 33 for detecting an error signal. The data magnetically recorded on the magneto-optic disc 1 is detected in accordance with a difference in the output between the first and second light receiving elements 29 and 30. The third light receiving element 33 is made of a multiple-split sensor, per se known, which outputs a tracking error signal by a push-pull method, and a focusing error signal by an astigmatism correction method.

The LC matrix will be discussed below in detail.

In order to use the LC matrix as a light phase modulating device, it is necessary to drive and control each pixel of the LC matrix independent of each other pixel. Namely, it is necessary for each pixel, in the portion to be modulated, to be optionally designated. Moreover, it is necessary to continuously vary the light phase for each pixel (0 to 2π), and maintain the same state for a period of time (optional). To this end, a driving system for the LC matrix is comprised of electrodes corresponding to the pixels, so that control voltages are applied to the corresponding pixels through data lines connected to the respective electrodes.

Figure 2:
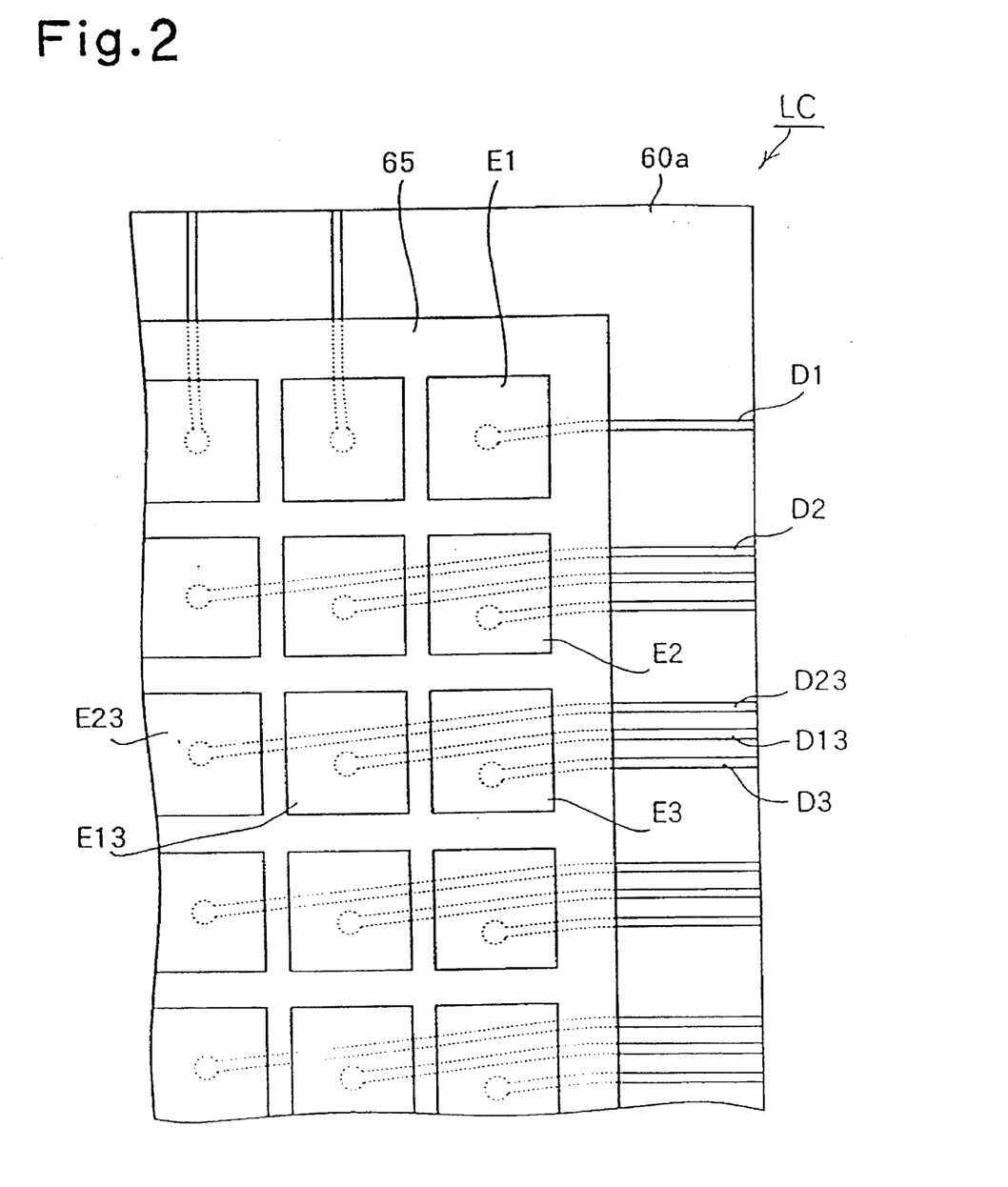
FIG. 2 is a cross sectional view showing an electrode structure of an LC matrix.

FIG. 2 shows an enlarged view of an electrode arrangement for the LC matrix, by way of example. The LC matrix is comprised of a liquid crystal held between glass substrates or the like, and is provided with pixel electrodes and data lines for driving the electrodes. In FIG. 2, the pixel electrodes (transparent electrodes) E1, E2, etc., are spaced at a predetermined distance in a matrix arrangement on a substrate 60a, and data lines D1, D2, etc., are connected to corresponding electrodes E1, E2, etc.

In order for the electrodes to be independently driven, each one of the transparent electrodes E1, E2, etc. corresponds to one of the data lines D1, D2, etc. Namely, one data line is connected to only one corresponding electrode. To this end, an insulation layer 65 is provided between the data lines and electrodes. This insulation layer 65 prevents data lines from being connected to electrodes other than corresponding electrodes, or from being connected to other data lines.

In order to highlight this point, in FIG. 2 it appears that the data line D23, connected to the corresponding electrode E23, is also connected to the electrodes E13 and E3. However, due to the insulation layer 65 between the data line D23 and the electrodes E13, E3, the data line D23 is only connected to the electrode E23. Hence, neither the electrode E13 nor E3 is driven by the data line D23. Similarly, the data line D13 is only connected to the electrode E13, and the data line D3 is only connected to the electrode E3.

If the LC matrix, as constructed above, is used as a light phase modulating device, the phase of light transmitted through each pixel of the LC matrix can be disturbed due to the insulation layer 65 and the thickness of the data lines D1, D2, etc. Namely, as shown in FIG. 2, some of the data lines D1, D2, etc., bridge the electrodes and reach the edge of the substrate 60a. If there is a difference in the thickness between the portion of the LC matrix in which there is no data line and the portion thereof in which there is a data line, the electrodes formed on the insulation layer are inclined or the surfaces of the electrodes are not flush with each other (i.e., the electrodes do not lie in the same plane), thus resulting in a disturbed phase of light.

To solve this problem, the LC matrix according to a first embodiment of the present invention is constructed as follows.

The LC matrix (transmission type LC matrix) comprises a liquid crystal 60 held between a pair of transparent substrates 60a and 60b that are provided on the inner surfaces thereof with the electrodes and the data lines. The structure of the LC matrix is symmetrical with respect to a vertical median line in FIG. 3, and accordingly, the following discussion will only be directed to one of the right and left halves.

Figure 3:
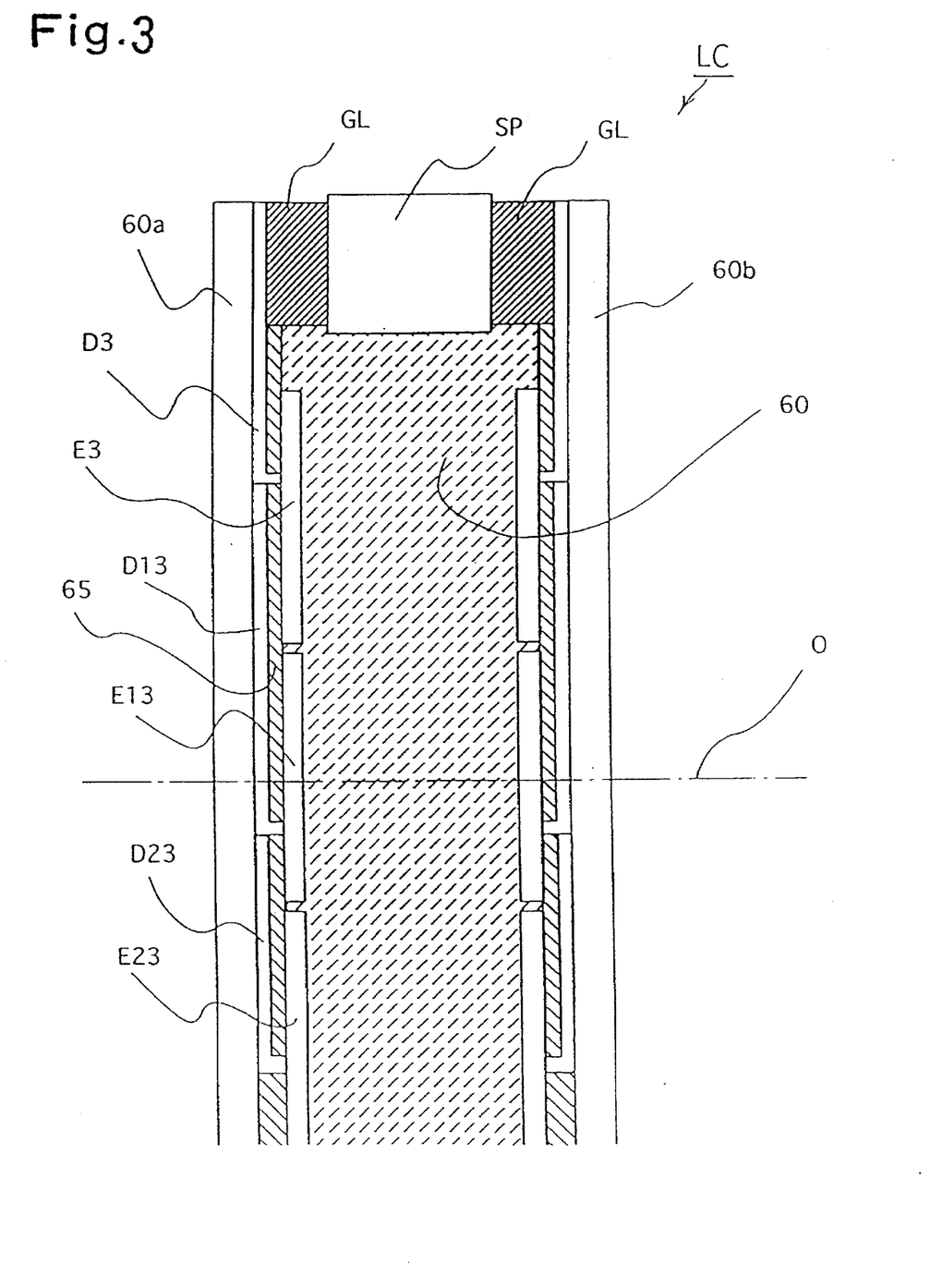
FIG. 3 is a cross sectional view of a transmission type LC matrix, according to the first embodiment of the present invention.

The substrate 60a (60b) is provided on an inner surface thereof adjacent to the liquid crystal 60, with the data lines D3, D13, D23, etc., and the insulation layer 65 is provided on the inner side of the data lines adjacent to the liquid crystal 60. The surface of the insulation layer 65 adjacent to the liquid crystal 60 is substantially normal to an optical axis O. The transparent pixel electrodes E3, E13, E23, etc. are provided on the inner side of the insulation layer 65 adjacent to the liquid crystal 60 and are spaced at a predetermined distance to form a matrix arrangement, as shown in FIG. 2. In other words, the transparent pixel electrodes E3, E13, E23, etc. are embedded in the insulation layer 65, so that the transparent pixel electrodes and the substrate are kept parallel. Each one of the transparent pixel electrodes E3, E13, E23, etc. is connected to a corresponding data line D3, D13, D23, etc. (as described above).

Although there are portions in which no data lines are present (data line absent portions) and portions in which data lines are present (data line present portions), since the surface of the insulation layer 65 defines a flat surface, substantially perpendicular to the optical axis O as mentioned above, the electrodes provided on the inner side of the insulation layer 65 adjacent to the liquid crystal 60 lie in substantially the same plane. Moreover, the data lines and the insulation layer 65 provided between the electrodes and the substrate 60a have approximately the same refractive index.

In the illustrated embodiment, the transparent electrodes and the data lines are made of ITO (Indium Tin Oxide) or tin oxide, both being commonly used as a material therefor. Also, in the illustrated embodiment, the insulation layer 65 can be made of yttrium oxide or zirconium oxide (the refractive indexes of both substances being approximately 1.90 to 2.00). Note that the substrates 60a and 60b are adhered to each other by a seal member GL (provided at both ends of the LC matrix) through a spacer SP (provided at both ends of the LC matrix), so that the liquid crystal 60 is enclosed in and surrounded by the substrates 60a, 60b, the spacers SP, and the seal members GL (the same is also true in other embodiments of the invention, which will be discussed hereinafter).

With this arrangement, the phase of the transmission light can be optionally controlled for each pixel of the LC matrix by driving and controlling the pixels independently.

Note that the thickness of the liquid crystal 60 in the optical axis direction O at the portion thereof in which there is no transparent electrode is different from that at the portion in which a transparent electrode is present. However, this difference in thickness is negligible, since the gap between the electrodes is extremely small and the modulation of the phase of the transmission light can be effected only at those electrode portions which lie in substantially the same plane.

In addition to the foregoing, the LC matrix according to the illustrated embodiment can be easily produced, since the data line layers in which the data lines are complicatedly arranged are provided on the substrates, and the insulation layers are provided on the data line layers.

Note that the light phase modulating device is not limited to a transmission type LC matrix as shown in the first embodiment. The present invention can also be applied to a reflection type liquid crystal element, as shown in a second embodiment, which will now be discussed below.

Figure 4:
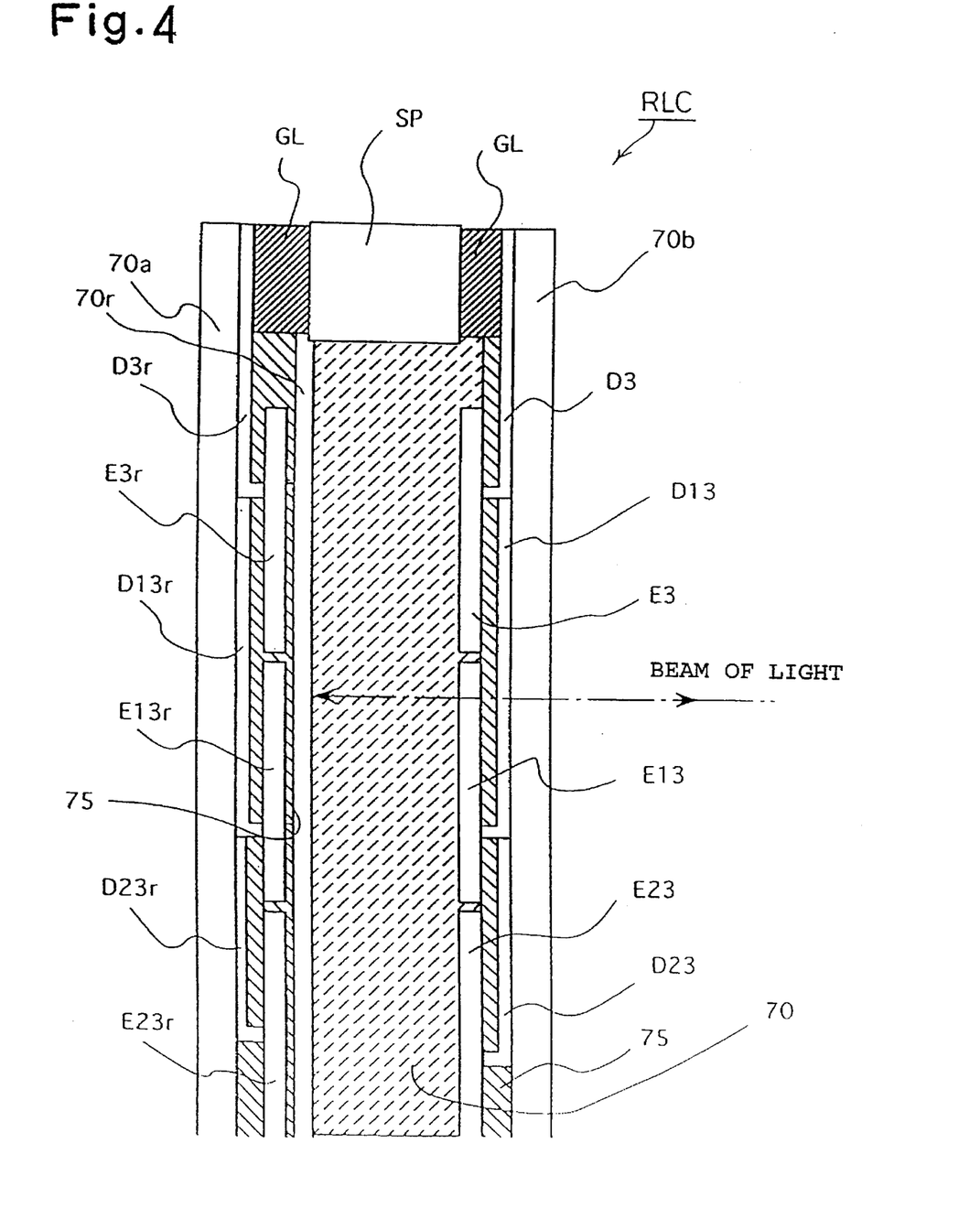
FIG. 4 is a cross sectional view of a reflection type LC matrix RLC, according to a second embodiment of the present invention.

FIG. 4 shows a second embodiment of the present invention, in which the light phase modulating device is embodied by a reflection type LC matrix RLC.

The reflection type LC matrix RLC comprises a substrate 70a (70b), data lines D3r, D13r, D23r etc., an insulation layer (SiO2) 75, electrodes E3r, E13r, E23r etc., a reflection layer (aluminum layer) 70r which is vapor-deposited on the insulation layer 75, and a liquid crystal 70, arranged in this order from the left side in FIG. 4.

The structure of the right half of the LC matrix RLC, with respect to the liquid crystal 70, is the same as that of the left half. Corresponding elements in the right and left halves are designated by like reference numerals. The substrates 70a and 70b are adhered to each other by seal members GL through spacers SP (GL and SP being provided at both ends of the LC matrix RLC). The liquid crystal 70 is enclosed and surrounded by the substrates 70a and 70b, the spacers SP, and the seal members GL. Transparent electrodes E3, E13, E23 etc. and data lines D3r, D13r, D23r etc. are embedded in the insulation layer (SiO2) 75, so that the pixel electrodes and the substrate are kept parallel.

In the second embodiment, light is transmitted through the substrate 70b, the data lines D3, D13 etc., the insulation layer 65, the transparent electrodes E3, El3 etc., and the liquid crystal layer 70, and is then reflected by the reflection layer 70r. The insulation layer 75 covers or surrounds the electrodes (ITO) E3r, E13r, E23r etc. The surface of the insulation layer 75, on which the reflection layer 70r is formed, lies in a plane perpendicular to the optical axis O (incidence and emission direction of the light). The insulation layer 75 on which the reflection layer 70r is formed, adjacent to the substrate 70a, may have a refractive index different from the refractive index of the electrodes.

Figure 5:
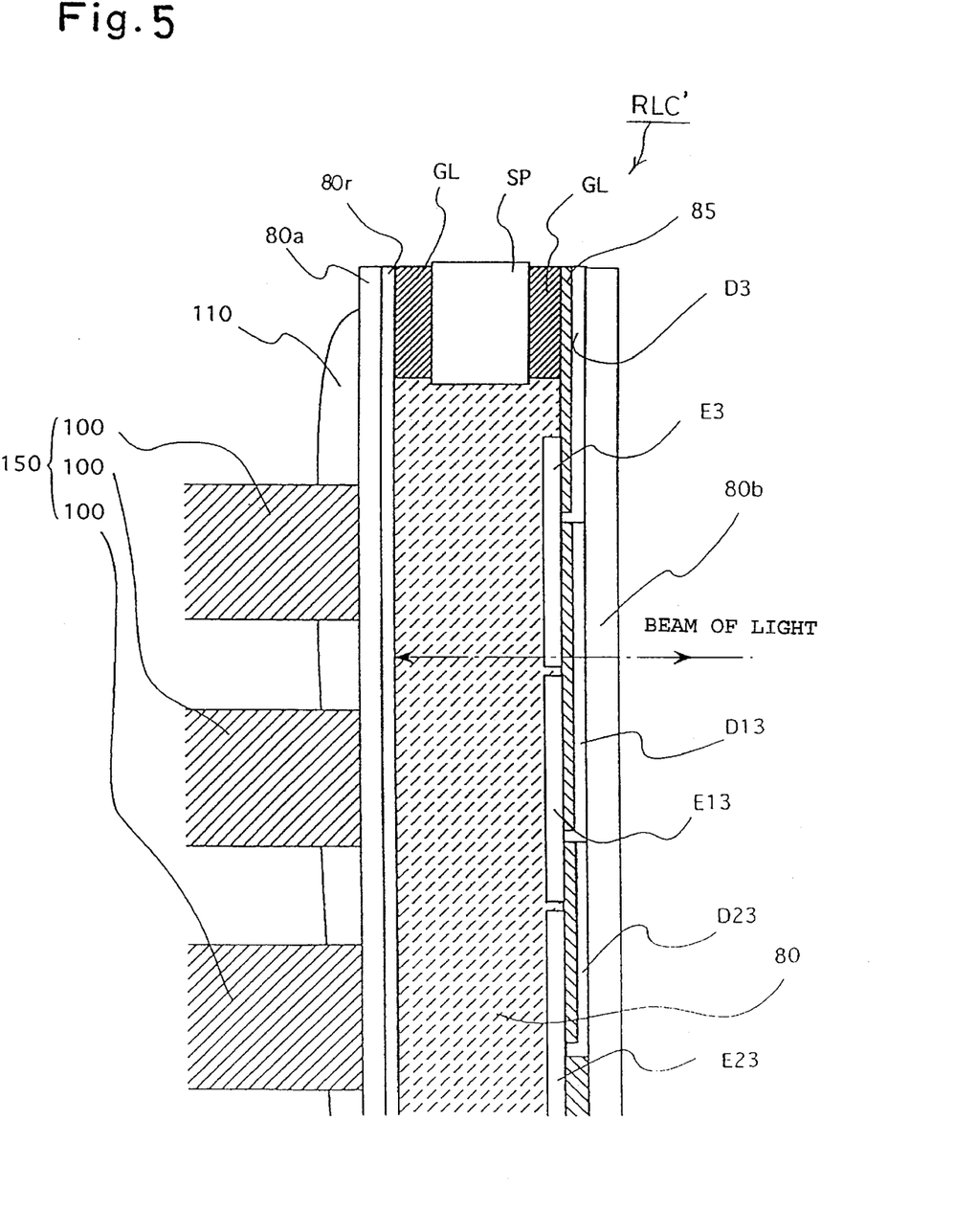
FIG. 5 is a cross sectional view of a reflection type LC matrix RLC', according to a third embodiment of the present invention.

FIG. 5 shows a third embodiment of the light phase modulating device which is comprised of a reflection type LC matrix RLC' different from the reflection type LC matrix RLC of the second embodiment. A substrate 80b, data lines D3, D13 etc., formed on the surface of the substrate 80b adjacent to a liquid crystal 80, transparent electrodes E3, E13 etc., an insulation layer 85 etc., are identical to those in the second embodiment. The substrate 80a is provided on the surface thereof adjacent to the liquid crystal 80, with a reflection layer (aluminum layer) 80r which is formed by a vapor deposition. A bundle 150 of insulated conductors 100 is connected to the surface of the substrate 80a that is located opposite to the reflection layer 80r, by means of an adhesive 110, etc., to form electrodes on the reflection side. The ends of the insulated conductors 100 are cut to lie in the same plane. Namely, the cut ends of the insulated conductors 100 of the conductor bundle 150 serve as electrodes for the substrate 80a. The pixel electrodes corresponding to the electrodes formed by the conductor bundle 150 on the substrate 80a are formed on the substrate 80b in the same arrangement as the second embodiment.

With the arrangement of the third embodiment, the structure can be simplified in comparison with a conventional reflection type LC matrix, in which predetermined patterns of electrodes and data lines are formed on the surfaces of the substrates. Moreover, since the electrodes and the data lines on the reflection side are formed by the same conductors in the third embodiment, an electrical connection to circuitry can be easily effected.

Figure 6:
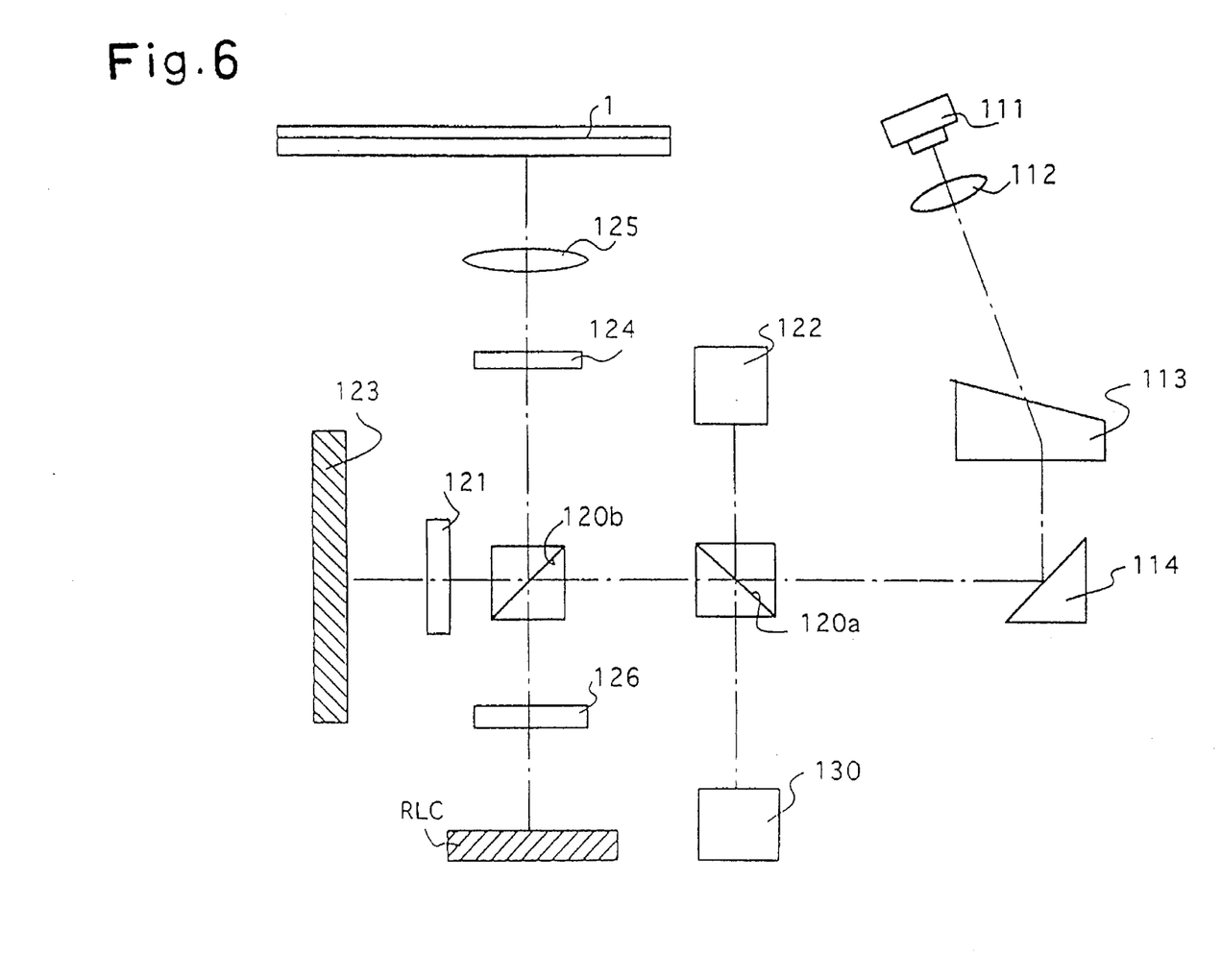
FIG. 6 is an explanatory view of an optical arrangement of an optical data reproducing apparatus using a reflection type LC matrix RLC; and, FIG. 7 is a cross sectional view of a transmission type LC matrix, according to a fourth embodiment of the present invention which corresponds to a modified embodiment of the first embodiment.

FIG. 6 schematically shows an optical arrangement of an optical data reproducing apparatus in which the above-mentioned reflection type LC matrix RLC (or RLC') is employed.

The laser light emitted from a semiconductor laser 111 is collimated by a collimating lens 112. It is then corrected to have a circular cross section by an anamorphic prism 113, reflected by a reflecting mirror 114 before being made incident upon a half mirror surface 120a. The light is then partly reflected by the half mirror surface 120a toward an APC sensor 122 to detect and control the power of the semiconductor laser 111.

The light transmitted through the half mirror surface 120a is made incident upon a polarization beam splitter (PBS) 120b. The light passing through the PBS 120b reaches and passes through a ¼λ plate 121 and is then reflected by a mirror 123 toward the PBS 120b. The light incident upon the PBS 120b is reflected thereby toward the magneto-optic disc 1 through a ¼λ plate 124 and an objective lens 125. The light reflected by the magneto-optic disc 1 passes through the PBS 120b and is made incident upon the reflection type LC matrix RLC through a ¼λ plate 126. When the light incident upon the reflection type LC matrix RLC is reflected thereby, the phase of the light is modulated. The light reflected by the LC matrix RLC is reflected by the PBS 120b toward the half mirror surface 120a and is received by a light receiver 130.

Figure 7:
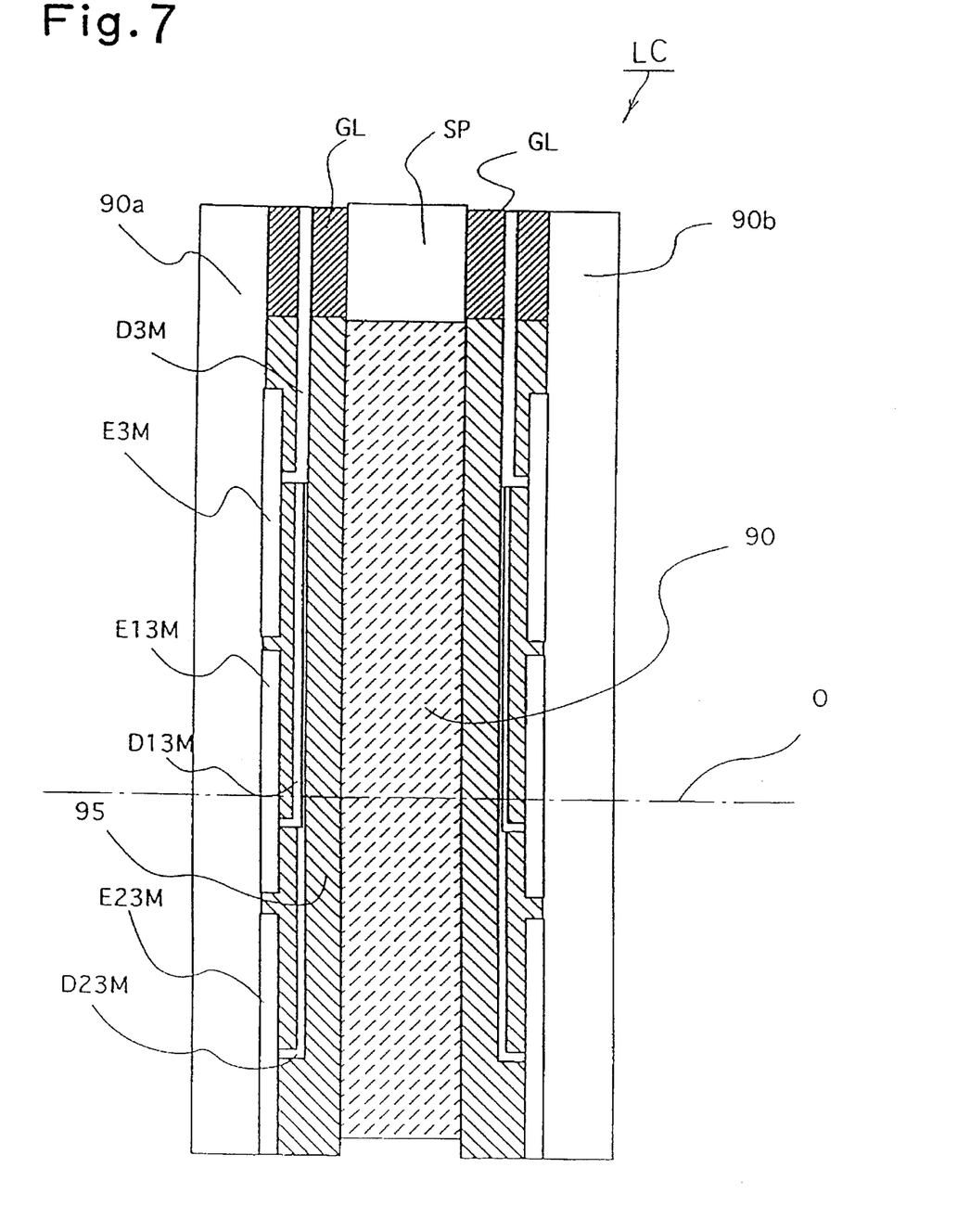

FIG. 7 shows a fourth embodiment in which the LC matrix of the first embodiment is slightly modified. In the fourth embodiment, electrodes E3M, E13M, E23M etc., are formed on a substrate 90a (90b), and data lines D3M, D13M, D23M etc., are formed on the electrodes through an insulation layer 95. The insulation layer 95 is provided to cover the surfaces of the electrodes and the data lines. The surface of the insulation layer 95 adjacent to a liquid crystal 90 lies in a plane substantially perpendicular to the optical axis O. Consequently, the projections and depressions (irregular surfaces) of the electrodes and the data lines are all absorbed or embedded in the insulation layer 95 which has a uniform thickness with respect to the substrate 90a. Note that the substrates 90a and 90b are adhered to each other by the seal members GL through the spacers SP (GL and SP being provided at both ends of the matrix), so that the liquid crystal 90 is enclosed in the LC matrix.

As can be seen from the above discussion, according to the present invention, the phase distribution of light is adjusted by the LC matrix, and hence, the S/N of the detected signals can be improved. As a consequence, the precision of the optical components of the apparatus in manufacture or in assembly can be eased, thus resulting in a realization of an inexpensive optical data recording and reproducing apparatus. Moreover, if the electrodes of the reflection type LC matrix are formed by a bundle of insulated conductors, not only can the LC matrix be simplified, but also the electrodes for the pixels can be easily connected to the LC matrix driving circuit.

What is claimed is:

1. A light phase modulating device which modulates a phase of light transmitted therethrough in a plane perpendicular to an optical axis, comprising:

a pair of transparent substrates that holds a liquid crystal therebetween and which are each provided with a plurality of pixel electrodes, said pixel electrodes being arranged in a dot matrix;

a plurality of data lines, each of which is connected to a corresponding pixel electrode of said plurality of pixel electrodes; and an insulation layer that insulates each data line of said plurality of data lines and a corresponding pixel electrode of said corresponding pixel electrodes from other data lines of said plurality of data lines and corresponding pixel electrodes, wherein a surface of said insulation layer located closer to said liquid crystal than said plurality of data lines lies in a plane substantially perpendicular to said optical axis, and wherein said insulation layer, said plurality of pixel electrodes and said plurality of data lines have substantially identical refractive indexes.

2. The light phase modulating device according to claim 1, wherein said plurality of pixel electrodes are provided adjacent to said pair of transparent substrates and said plurality of data lines are provided closer to said liquid crystal than said plurality of pixel electrodes.

3. The light phase modulating device according to claim 1, wherein said plurality of data lines are provided adjacent to said pair of transparent substrates and said plurality of pixel electrodes are provided closer to said liquid crystal than said plurality of data lines.

4. The light phase modulating device according to claim 1, wherein said plurality of pixel electrodes are independently driven by the corresponding data lines.

5. A light phase modulating device which modulates a phase of light transmitted therethrough in a plane perpendicular to an optical axis, comprising:

first and second substrates that hold a liquid crystal therebetween;

a plurality of data lines provided on each of said first and second substrates;

a plurality of pixel electrodes, each of which is connected to a corresponding data line of said plurality of data lines; and, an insulation layer that insulates each data line of said plurality of data lines and pixel electrode of said plurality of pixel electrodes from other data lines of said plurality of data lines and pixel electrodes of said plurality of pixel electrodes, wherein said first substrate is a transparent substrate, and said insulation layer, said plurality of pixel electrodes and said plurality of data lines, provided on said first substrate have substantially identical refractive indexes, said insulation layer having a surface provided on said first substrate which lies in a plane located closer to said liquid crystal than said plurality of data lines, and lies in a plane substantially perpendicular to said optical axis, said second substrate being provided with a reflection layer which reflects light incident thereupon from said first substrate.

6. The light phase modulating device according to claim 5, wherein said plurality of data lines and said plurality of pixel electrodes, provided on said second substrate, are provided on a surface of said second substrate that is located opposite to said reflection layer.

7. The light phase modulating device according to claim 5, wherein said plurality of data lines and said plurality of pixel electrodes, provided on said second substrate, are made of a bundle of insulated conductors.

8. The light phase modulating device according to claim 4, wherein said plurality of pixel electrodes are independently driven by corresponding data lines.

9. A light phase modulating device which modulates a phase of light transmitted therethrough in a plane perpendicular to an optical axis, comprising:

a pair of transparent substrates that hold a liquid crystal therebetween;

a plurality of pixel electrodes that are located inside said pair of transparent substrates, said pixel electrodes being arranged in a dot matrix;

a plurality of data lines that are each connected to a respective pixel electrode of said plurality of pixel electrodes; and an insulation layer that is located between said liquid crystal and said pair of transparent substrates, wherein at least said plurality of data lines are embedded in said insulation layer, so that said plurality of pixel electrodes and said pair of transparent substrates are kept parallel.

10. The light phase modulating device according to claim 9, further comprising a reflection layer that is located at one side of said liquid crystal.

11. The light phase modulating device according to claim 9, wherein said plurality of pixel electrodes are embedded in said liquid crystal.

12. The light phase modulating device according to claim 9, wherein said plurality of pixel electrodes are embedded in said insulating layer.

13. An optical data recording and reproducing apparatus to correct a wavefront aberration of light emitted from a light source and converged onto a data recording medium through an image forming optical system, comprising:

a liquid crystal matrix comprised of a number of liquid crystal elements in a two-dimensional matrix arrangement, located in an optical path between said light source and said data recording medium, each liquid crystal element being capable of independently controlling a phase of light incident thereupon; and, a liquid crystal control means for individually controlling said number of liquid crystal elements to minimize said wavefront aberration of a beam spot converged onto said data recording medium, wherein said liquid crystal matrix comprises:

a pair of transparent substrates that hold a liquid crystal therebetween;

a plurality of pixel electrodes that are located inside said pair of transparent substrates, said plurality of pixel electrodes being arranged in a dot matrix;

a plurality of data lines, each data line of said plurality of data lines being connected to one pixel electrode of said plurality of pixel electrodes; and an insulation layer that is located between said liquid crystal and said pair of transparent substrates;

wherein at least said plurality of data lines are embedded in said insulation layer, so that said plurality of pixel electrodes and said pair of transparent substrates are kept parallel.

14. The optical data recording and reproducing apparatus according to claim 13, further comprising a reflection layer that is located at one side of said liquid crystal.

15. The optical data recording and reproducing apparatus according to claim 13, wherein said plurality of pixel electrodes are embedded in said liquid crystal.

16. The optical data recording and reproducing apparatus according to claim 13, wherein said plurality of pixel electrodes are embedded in said insulating layer.

* * * * *